US010954003B2

(12) United States Patent
Meek (10) Patent No.: US 10,954,003 B2
(45) Date of Patent: Mar. 23, 2021

(54) CONSTELLATION CONFIGURATION FOR CONSTELLATIONS HAVING A LARGE NUMBER OF LEO SATELLITES

(71) Applicant: WorldVu Satellites Limited, Arlington, VA (US)

(72) Inventor: Matthew Cameron Meek, Haymarket, VA (US)

(73) Assignee: WORLDVU SATELLITES LIMITED, Arlington, VA (US)

( * ) Notice: Subject to any disclaimer, the term of this patent is extended or adjusted under 35 U.S.C. 154(b) by 715 days.

(21) Appl. No.: 15/653,913

(22) Filed: Jul. 19, 2017

(65) Prior Publication Data

US 2018/0022474 A1    Jan. 25, 2018

Related U.S. Application Data

(60) Provisional application No. 62/364,670, filed on Jul. 20, 2016.

(51) Int. Cl.
| | | |
|---|---|---|
| *B64G 1/10* | (2006.01) | |
| *B64G 1/24* | (2006.01) | |
| *H04B 7/185* | (2006.01) | |

(52) U.S. Cl.
CPC ......... *B64G 1/1085* (2013.01); *B64G 1/1007* (2013.01); *B64G 1/242* (2013.01); *H04B 7/185* (2013.01)

(58) Field of Classification Search
CPC .... B64G 1/1085; B64G 1/242; B64G 1/1007; B64G 1/1014; B64G 1/1021; H04B 7/185; H04B 7/18513; H04B 7/195
See application file for complete search history.

(56) References Cited

U.S. PATENT DOCUMENTS

| | | | | |
|---|---|---|---|---|
| 5,722,042 A | * | 2/1998 | Kimura | H04B 7/195 342/352 |
| 5,887,257 A | * | 3/1999 | Olds | H04B 7/195 455/427 |
| 6,050,525 A | | 4/2000 | Drake | |
| 6,249,513 B1 | * | 6/2001 | Malarky | H04B 7/18521 370/316 |
| 6,263,466 B1 | * | 7/2001 | Hinedi | H03M 13/2903 714/755 |

(Continued)

FOREIGN PATENT DOCUMENTS

| | | |
|---|---|---|
| CA | 2266155 A1 | 9/2000 |
| WO | 99/63680 A2 | 12/1999 |

OTHER PUBLICATIONS

Authorized Officers: Garcia Miralles, Laura and Duval, Yann, International Search Report and Written Opinion issued in counterpart PCT application No. PCT/US2017/043028, dated Apr. 17, 2018, 17 pp.

*Primary Examiner* — Assres H Woldemaryam
(74) *Attorney, Agent, or Firm* — Sughrue Mion, PLLC (57) ABSTRACT

A configuration for a satellite constellation has a plurality of planes, each plane including a plurality of satellites therein, at least some of the planes situated at a different altitude than other of the planes. In some embodiments, all planes contain the same number of satellites; in some other embodiments, at least one plane includes a different number of satellites than the other planes in the constellation. In some embodiments, the satellites in each plane are evenly spaced.

16 Claims, 9 Drawing Sheets

(56) References Cited

U.S. PATENT DOCUMENTS

| | | | | |
|---|---|---|---|---|
| 6,267,329 | B1* | 7/2001 | Chethik | B64G 1/1007 |
| | | | | 244/158.4 |
| 6,310,910 | B1* | 10/2001 | Shah | H04B 7/1858 |
| | | | | 375/222 |
| 6,366,761 | B1* | 4/2002 | Montpetit | H04B 7/195 |
| | | | | 370/230 |
| 6,493,342 | B1* | 12/2002 | Breslow | H04B 7/18584 |
| | | | | 370/394 |
| 2001/0045494 | A1* | 11/2001 | Higgins | H04B 7/18513 |
| | | | | 244/158.4 |
| 2002/0150060 | A1* | 10/2002 | Montpetit | H04B 7/18521 |
| | | | | 370/316 |
| 2008/0086267 | A1* | 4/2008 | Stolte | H04B 7/18513 |
| | | | | 701/300 |
| 2010/0039984 | A1* | 2/2010 | Brownrigg | H04B 7/18584 |
| | | | | 370/316 |
| 2014/0027576 | A1* | 1/2014 | Boshuizen | B64G 1/1085 |
| | | | | 244/158.6 |
| 2014/0341586 | A1* | 11/2014 | Wyler | H04B 10/118 |
| | | | | 398/115 |
| 2016/0094288 | A1* | 3/2016 | Krebs | H04B 7/19 |
| | | | | 455/12.1 |
| 2017/0070939 | A1* | 3/2017 | Chong | H04B 7/18521 |
| 2017/0353871 | A1* | 12/2017 | Tatum | H04W 16/28 |
| 2018/0310124 | A1* | 10/2018 | Regan | B64G 1/1085 |

\* cited by examiner

CONSTELLATION CONFIGURATION FOR CONSTELLATIONS HAVING A LARGE NUMBER OF LEO SATELLITES

FIELD OF THE INVENTION

The invention pertains generally to satellites and more particularly to a constellation design.

BACKGROUND OF THE INVENTION

Artificial satellites (hereinafter after "satellites") are used for telecommunications, navigation, disaster monitoring, weather monitoring/forecasting, astronomical observations, and intelligence gathering, to name but a few of their many important functions. A satellite constellation is a group of satellites working in concert under shared control. Their synchronized behavior provides significant improvements, relative to a lone satellite, in temporal and spatial coverage. The first constellation to be used operationally—TRANSIT—was deployed in the early 1960s by the US Navy.

Satellite constellation design is often viewed, mistakenly, as the simple process of placing multiple copies of a single satellite in modified orbits. Quite to the contrary, the essentially infinite number of choices for the six Keplerian orbital parameters makes the design of a satellite constellation an exceedingly difficult problem.

There are no definitive rules for constellation design; the design parameters are mission dependent. Typically, all satellites in a constellation have the same altitude, eccentricity, and inclination so that perturbations affect the satellites in the same way and the geometry is preserved with minimal station-keeping. The primary design factors for the constellation include: the number of satellites, the number of orbital planes, the altitude, the inclination, plane spacing, and eccentricity (of orbit).

The number of orbital planes varies based on coverage needs. Altitude is typically the same for all satellites in the constellation. Increasing the altitude increases the coverage of each satellite in the constellation thereby decreasing the number of satellites required, but it also increases launch and transfer costs. It also increases path losses for RF transmissions and increases communications latency. An increase in RF power is required to compensate for the increased path losses, as is a concomitant increase in the size of the hardware that is required to provide the increased power. Ultimately, this requires an increase in the size and the cost of the satellites. Inclination determines the latitude distribution of coverage. The minimum elevation angle, which must be consistent for all satellites, dictates the coverage of each satellite. Plane spacing impacts ground coverage. Elliptic orbits enable a satellite to stay in a particular region for a longer period of time while circular orbits provide the benefit of constant altitude.

To simplify the problem of constellation design, certain geometries have been proposed. One such geometry is the Walker-Delta constellation. This constellation assumes that all of the satellites are at the same altitude.

In addition to the six Keplerian parameters and the other considerations mentioned above, a particularly important design factor is collision avoidance. In addition to loss or compromise of the mission, a collision between constellation satellites or other satellites generates space debris. Such debris becomes an ever-present risk to other satellites, particularly those remaining in the constellation in which the collision occurred, since any debris generated may remain in the vicinity of the constellation for a long time. As the number of satellites in a constellation increases, so does the complexity of the collision-avoidance problem.

SUMMARY

The present invention provides a constellation configuration that is particularly advantageous for constellations having at least 100 satellites. The satellites are segregated into "planes," wherein each plane typically, but not necessarily, has an equal number of satellites. In accordance with the present invention, and unlike the prior art, at least some of the planes of satellites are flown at a different altitude than other of the planes in the constellation. In the illustrative embodiment, all of the planes of the constellation are at a different altitude. For constellations having such large numbers of satellites, the configuration disclosed herein provides a higher level of passive safety within the constellation than with conventional designs wherein all satellites are at substantially the same altitude.

By way of background, a constellation configuration initially considered by the inventor positioned all of the satellites at the same altitude, as is conventional in the art. In additional to any historical reasons for selecting this configuration, it was well suited to the payload footprint on the Earth's surface. In particular, the original payload had a circular footprint, which required satellites in adjacent planes to maintain a constant relative in-track position with each other in order to prevent opening gaps in the coverage on the ground. A design change in the payload resulted in a change to the footprint: from circular to rectangular. This eliminated the need to maintain satellites in adjacent planes in a constant relative in-track position.

Analysis of the initial constellation configuration (i.e., all satellites at the same altitude) revealed that although that particular configuration makes it relatively easy to place and remove satellites from the constellation, there were several significant drawbacks. In particular, this configuration would require very small station-keeping boxes (the three-dimensional limits of allowable satellite movement centered around the satellite's desired station) in order to ensure that the rather large number of satellites would safely pass one another as they transition over the poles of the Earth. Furthermore, it might not be possible to maintain even spacing between satellites in each plane, which is required by the payloads to provide even ground coverage (discussed further below). A number of constellation configurations were explored in an attempt to eliminate these issues.

The illustrative embodiment has, as indicated above, all of the planes at different altitudes. The separation between adjacent planes is at least 500 meters; in the illustrative embodiment, the separation is about 5 kilometers.

The multi-altitude configuration has a number of advantageous characteristics, including:
  Spacing between satellites in each plane can be arbitrarily set. Additional spare satellites can be placed between operational satellites within a plane, enabling rapid replacement of operational satellites that fail or are decommissioned.
  An ability to maintain even spacing between satellites within a plane when the number of satellites in some other planes differ (such as when a satellite in another plane fails). Maintaining such spacing would be very problematic for large constellations if all the satellites were at the same altitude. In particular, having the constellation's planes at different altitudes removes the necessity for the planes to "mesh" together like gears. Having different numbers of satellites in each plane, at the same altitude, requiring them to be evenly spaced, and requiring that they maintain reasonable distances from each other, creates an unworkable problem. To maintain proper separation, the satellites would have to be unevenly spaced in order to mesh with other planes. Placing the planes at different altitudes, in accordance with claimed invention, creates an ability to maintain reasonable distances between satellites, thereby adding a degree of freedom that enables them to be evenly spaced.

Relatively more relaxed station-keeping limits than conventional configurations. In fact, for the illustrative embodiment, the station-keeping limits are driven by payload, not by safety constraints (i.e., self-conjunctions). This reduces the number of maneuvers performed, reduces workload, and reduces disruptions to service.

A high level of passive safety. Each of the planes are passively safe with respect to one another. That is, an uncontrolled satellite in one plane will not intersect the altitude of other planes for several years, providing more than adequate time to adjust the constellation and avoid potential collisions. Also, locating each plane at a different altitude enables flexibility in avoiding debris (or other satellites). In that regard, the altitude of any given plane can be altered somewhat to avoid debris without impact on other planes.

Potential drawbacks of the multi-altitude configuration are that:

The insertion and removal of satellites in the constellation is relatively more complex than for conventional configurations. However, with relatively greater distances between adjacent planes (i.e., 5000 meters vs. 500 meters), the complexity is significantly reduced.

Also, there is a potential for an increase in telemetry, tracking, and command ("TT&C") co-channel interference occurrences.

Satellites in different planes (i.e., different altitudes) will have different fields-of-view and different path losses.

As a consequence of the potential drawbacks, in addition to any other considerations, the multi-altitude configuration might not be suitable for all types of missions. For example, the illustrative constellation configuration results in satellites in one plane having motion that is uncorrelated to the motion of satellites in another plane. More particularly, satellites at a lower altitude will move forward over time relative to satellites that are at a higher altitude. Such motion would not be desirable for constellations that have payload footprints that interlock. This also complicates (but not necessarily precludes) the use of inter-satellite links within the constellation.

DETAILED DESCRIPTION

Those skilled in the art will appreciate that the term "altitude" is referenced to the ground, which changes in radius from the center of the Earth by up to about 30 km depending on surface location. Orbits are ellipses with a narrowest part (minor axis) and a widest part (major axis) through the center; the semi-major axis is half of the major axis and describes the average height of an orbit. For simplicity, the term "altitude" is used in this disclosure in instances in which it might be more appropriate to reference "SMA;" those skilled in the art will recognize those instances and understand the distinction.

Figure 1A:
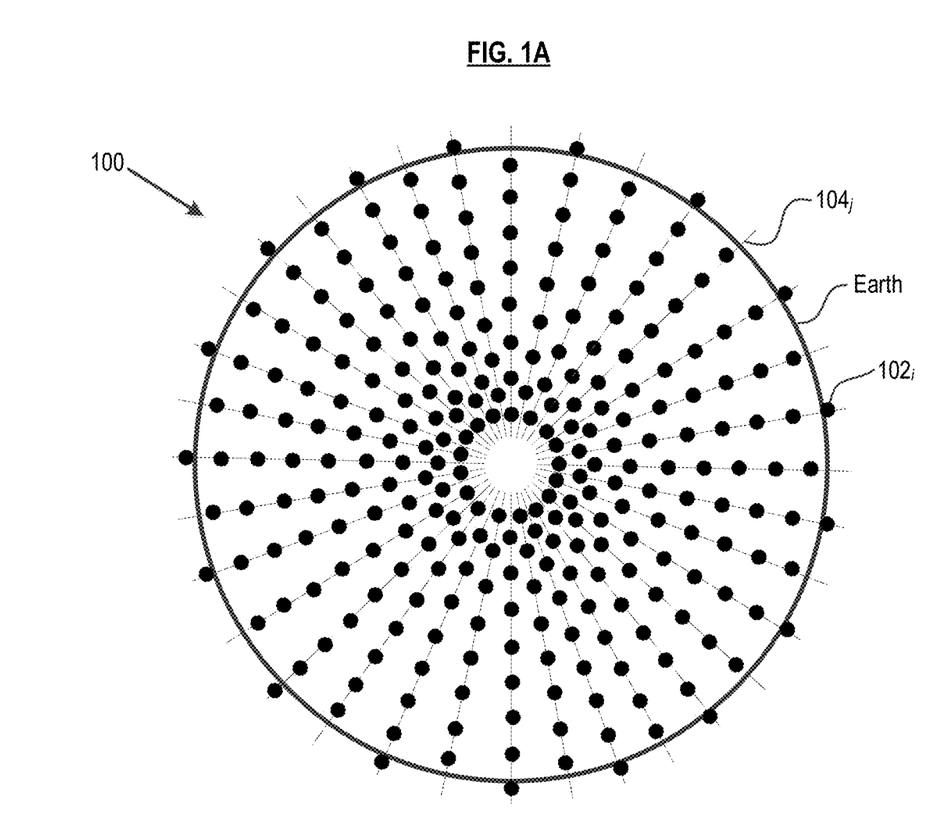
FIG. 1A depicts a satellite constellation in accordance with the illustrative embodiment of the invention, wherein the constellation is viewed from space directly above a polar region of the Earth.
Figure 1B:
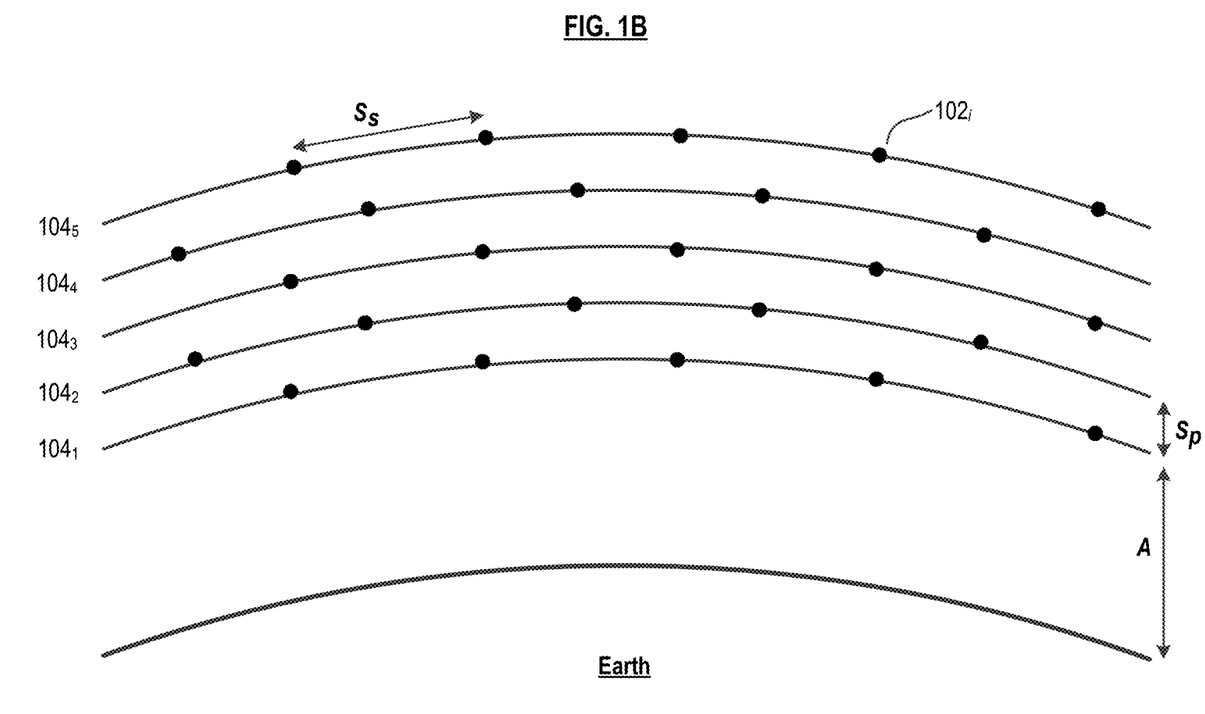
FIG. 1B depicts a side view of a portion of the satellite constellation of FIG. 1A.

FIGS. 1A and 1B depict satellite constellation 100 in accordance with the illustrative embodiment of the present invention. In the illustrative embodiment, satellite constellation 100 provides internet connectivity to a plurality of users, which can be residential or business users. Constellation 100 includes a plurality of satellites $102_i$ where i=1, m (collectively "satellites 102") arranged in a plurality of planes $104_j$ where j=1, n (collectively "planes 104"). All satellites 102 within a given plane are flown at the same altitude, but each plane is flown at a unique altitude from all other planes (five such planes $104_1$, $104_2$, $104_3$, $104_4$, and $104_5$ are depicted in FIG. 1B).

In the illustrative embodiment, satellites 102 within each plane $104_j$ are equally spaced (with spacing $S_s$), and each plane has an equal number of satellites. In some other embodiments, or as may arise due to upsets (satellite malfunction, decommissioning, etc.), one or more planes 104 might have a different number of satellites than other planes in the constellation.

In the illustrative embodiment, all planes 104 in constellation 100 are equidistant from one another, having spacing $S_p$ between adjacent planes. Spacing $S_p$ is typically in a range from about 500 to 5000 meters. In some other embodiments, spacing $S_p$ between one or more of planes $104_j$ differs from the spacing between other planes in constellation 100. The presence of debris, for example, near one particular plane of the constellation might dictate altering that plane's altitude, resulting in non-uniform plane spacing. Additionally, in some embodiments, a constellation might be designed with non-uniform plane spacing to satisfy certain operational considerations.

The configuration of constellation 100, wherein each plane of satellites is located at a unique altitude, is particularly well suited to constellations that include a relatively large number of satellites. For example, constellation 100 will typically, although not necessarily, include 100 or more satellites (i.e., m=100+) in five or more planes. Of course, the invention is applicable to any number of satellites greater than one; however, with fewer satellites, the benefits of the configuration diminish.

For example, in some embodiments, constellation 100 includes 17 planes 104 (i.e., j=17) having 36 satellites 102 each and in some other embodiments, constellation 100 includes 17 planes 104 having 49 satellites 102 each. In the illustrative embodiment, satellites 102 are in low Earth orbit (LEO), at an altitude A of up to about 2000 kilometers. In some other embodiments, constellations in accordance with the present teachings include satellites that are in medium Earth orbit (MEO) or other orbits.

There are a variety of criteria to determine how to apportion satellites $102_i$ between planes $104_j$ and how many planes to use. One criteria is ground coverage and another is minimum elevation angle for users, but this is mission dependent.

Furthermore, a constellation's altitude can impact the allocation. For example, a constellation at a relatively higher altitude can achieve full line of sight coverage of the ground with fewer satellites and/or planes than a constellation at a relatively lower altitude (e.g., MEO rather than LEO, etc). But other design considerations may constrain the altitude, as in the case of the illustrative embodiment, as discussed below.

In the illustrative embodiment, in which the satellite is intended to provide Internet service, the altitude was chosen to be low enough to provide low-latency in the data transmission to the end user, but high enough to avoid most of the space debris that is in LEO. With the altitude decided, the number and spacing of planes was chosen to provide a certain minimum elevation angle for users on the ground. And the minimum number of satellites in a plane to provide minimum service can be chosen the same way; to provide a minimum elevation angle from the ground. Beyond the minimum number of satellites, additional satellites are added to each plane in order to increase the bandwidth that can be provided to end users and to increase coverage area.

In the illustrative embodiment, an additional consideration is that even though global coverage is provided with the minimal number of satellites, interference with GEO satellites must be avoided. Such interference is avoided by pitching the satellites (disclosed in U.S. patent application Ser. No. 14/626,360), but as a consequence, service cannot be provided to customers near the equator with the minimum number of satellites. By adding additional satellites, they can be pitched to avoid the interference while, at the same time, service can be provided to customers at the equator.

Figure 2:
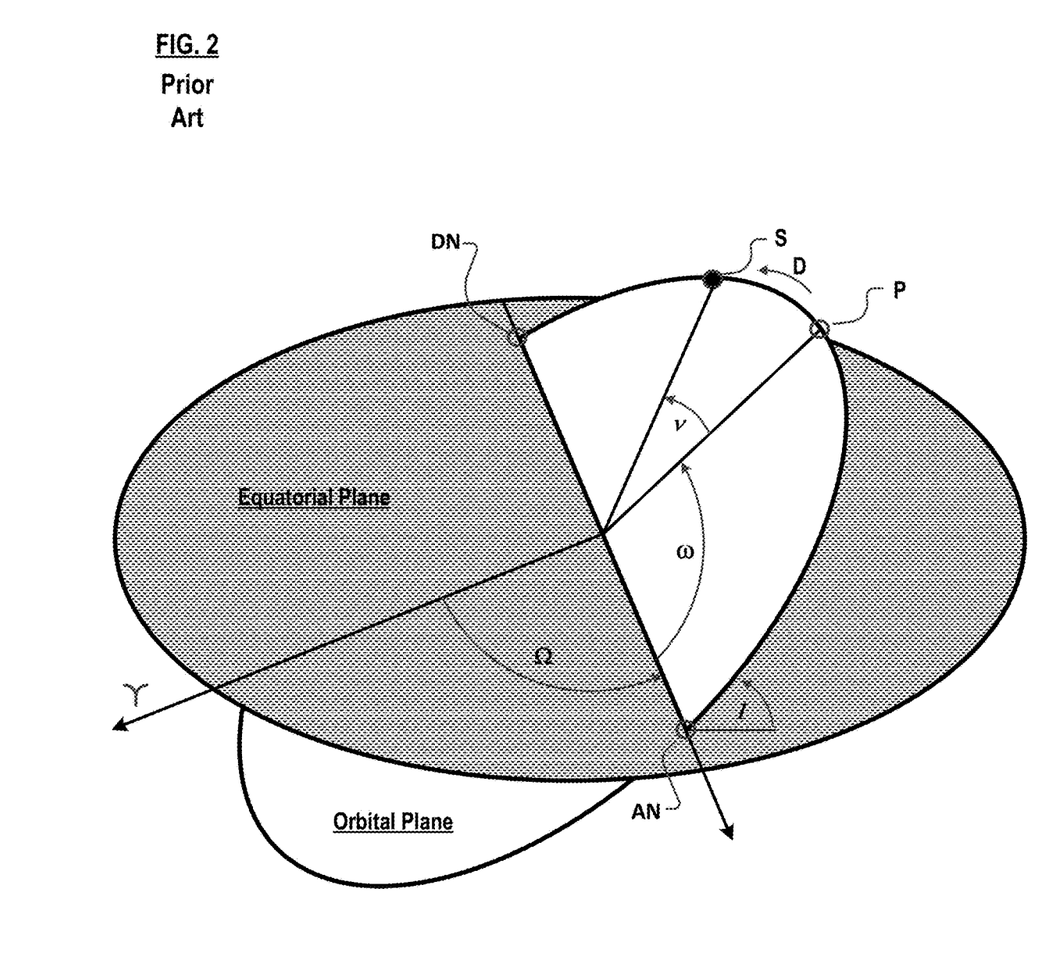
FIG. 2 depicts a diagrammatic perspective view of the orbital plane of a satellite orbiting the Earth (not depicted).

The orbit of a satellite can be precisely specified by a group of orbital parameters, referred to as "Keplerian elements." Six parameters (six Keplerian elements) are necessary to unambiguously define an arbitrary and unperturbed orbit. Those elements include eccentricity (defines the shape of the orbit), semi-major axis (defines the size of the orbit), inclination (defines the orientation of the orbit with respect to the Earth's equator), right ascension of the ascending node (defines the location that the satellite's orbit crosses the Earth's equatorial plane), argument of perigee (defines where the perigee is with respect to the Earth's equator), and true anomaly (defines the location of the satellite in orbit with respect to perigee). FIG. 2, which is used to illustrate some of the Keplerian elements, is a diagrammatic perspective view of the orbital plane of satellite S orbiting the Earth (not depicted; located at the center of the equatorial plane) in the direction of arrow D.

The satellite's orbit is depicted as an elliptical orbit having an inclination I with respect to the equatorial plane. As satellite S traverses the orbit in the direction of arrow D, it passes through the equatorial plane twice—once at point AN, referred to as the "ascending node," at which it passes from the southern hemisphere into the northern hemisphere, and at point DN, referred to as the "descending node," at which it passes from the northern hemisphere into the southern hemisphere. The right ascension of the ascending node ("RAAN") is the angle, $\Omega$, between the vernal equinox (i.e., the point on the equator at which the sun appears to rise on the first day of Spring each year) and an axis extending from the center of the Earth and through the ascending node AN. The argument of perigee, $\omega$, is the angle (within the orbital plane) measured from the ascending node AN to the perigee point P along the satellite's direction of travel. True anomaly, $\nu$, is the angle (within the orbital plane) between perigee and the satellite at a specific time. Occasionally, a parameter called the "argument of latitude" is referenced, which is simply the sum of true anomaly $\nu$ and argument of perigee $\omega$.

As those of skill in the art will appreciate, the elements of a given orbit are not fixed in time. Rather, they vary continuously as a consequence of perturbing influences that act on orbiting satellite S. Such influences include, among many others: the gravitational influences of the sun, moon, and Earth, the relative positions of which are continuously changing, and atmospheric drag. Working from a set of accurate initial conditions, it is possible to predict with reasonable accuracy the amount of variation that the parameters of the satellite orbit will experience within any time frame, or "epoch," using known orbital computational tools.

The configuration of constellation 100 must account for certain constraints and considerations, including, without limitation:

A. Payload Constraints. The constellation configuration must support the payload. Furthermore, the configuration should not result in excessive spacecraft maneuvers, which impact service availability and predicted ephemeris accuracy.

B. TT&C Co-channel interference. Satellites at the same azimuth and elevation as seen from a TT&C location that are on the same frequency can cause interference with each other.

C. Orbit Raising Complexity. The manner in which the constellation is constructed affects methods for adding satellites thereto, which, in turn, impacts the ground system complexity and operator load. Furthermore, reducing conjunction probability through constellation configuration reduces maneuvers and system workload.

D. Constellation Operational Complexity. Natural perturbations cause the inclination and RAAN to change over time. Tight station-keeping limits result in increased maneuvers and system workload. Also, concept of operations for adding and removing satellites affect system/operator workload.

E. General Mission Orbit Constraints. The constraints listed below in TABLE I are specific to the illustrative embodiment, which is a constellation for providing low-latency Internet access. As those skilled in the art will appreciate, these constraints will be different for different missions.

TABLE I

General Mission Orbit Constraints

| Parameter | Nominal Value | Range Limits |
| --- | --- | --- |
| Semi-major axis | 7578 kilometers | +/−60 kilometers |
| Inclination | 87.9 degrees | +/−0.25 degrees |
| RAAN Separation Between Planes | 10.15 degrees | +/−0.35 degrees |
| Relative Argument of Latitude | 10 degrees (36 sats/plane) 7.35 degrees (49 sats/plane) | +/−0.1 degrees |

In light of these and other considerations, a constellation configuration, as provided below in TABLE II, was developed.

TABLE II

Constellation Configuration

| Parameter | Nominal Value |
| --- | --- |
| Semi-major axis ("SMA") | 7536-7621 km (5 km between planes) |
| Inclination | 87.9 degrees (set based on SMA to maintain frozen orbit and nominal RAAN drift) |
| RAAN Separation Between Planes | 10.15 deg |
| Eccentricity | 0.001155 (set based on SMA to maintain frozen orbit) |
| Argument of Perigee | 90 degrees |

Figure 3:
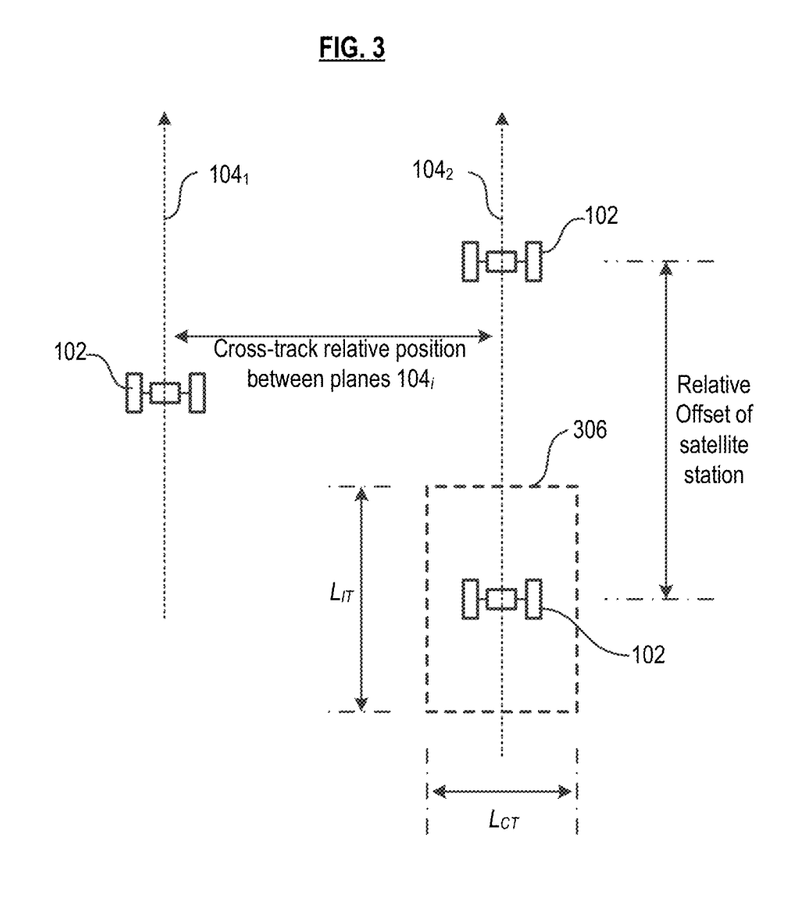
FIG. 3 depicts a station-keeping box for a satellite in a satellite constellation in accordance with the present teachings.

Station-Keeping Box definition. By virtue of the multi-altitude constellation configuration, intra-plane conjunction risk is removed as a cross-track limiter and satellites can be evenly spaced in each plane. FIG. 3 depicts portions of two planes, $104_1$ and $104_2$, and satellites 102 in such planes. Station-keeping box 306 is illustrated for one of the satellites in plane $104_2$. The limits of box 306 include in-track limits $L_{IT}$ and cross-track limits $L_{CT}$, which are provided below for the illustrative embodiment in TABLE III. FIG. 3 also depicts the relative in-plane offset between satellite stations and the cross-track relative position between planes, the latter being largest at the equator.

TABLE III

Station-Keeping Box

| Parameter | Nominal Value | Range Limits |
| --- | --- | --- |
| Relative in-track box limit | 10 degrees (36 sats/plane) 7.35 degrees (49 sats/plane) | +/−0.1 degrees |
| Cross-track limit | 0 degrees | +/−0.35 degrees |

In the illustrative embodiment, station-keeping boxes are evenly spaced around each plane based on the number of satellites in the plane (e.g., 36 boxes for 36 satellites, 49 boxes for 49 satellites, etc.). Due to eccentricity of the orbit, the centers of the box have a once per revolution in-track oscillation motion relative to each other. That oscillation results in a movement of up to 0.045 degrees between adjacent boxes in plane, and 0.5 degrees maximum to a "reference" box (chosing one satellite per plane as the reference, the maximum that any satellite within the plane will deviate over one revolution from its local reference is 0.5 degrees). Natural perturbations induce inclination and RAAN motions between adjacent planes. There is a maximum of 0.35 degrees offset to the reference plane and 0.1 degrees to the adjacent plane. It is notable that using natural perturbation limits for cross-track reduces the number of maneuvers to be performed, which, in turn, reduces impacts on service.

The specifics of putting a satellite into a constellation, or removing it therefrom, are dependent on the constellation's configuration. Several events require adding or removing a satellite from the constellation. One event is the initial build-up of the constellation. Since, in embodiments of the invention, launches will be unlikely to carry a complete plane of satellites (e.g., 36 satellite, etc.), a plane will have to be "topped-up" to reach the desired number. Another event might be the expansion of the constellation, for example from 36 satellites per plane to 49 satellites per plane. Yet another event is replacement of a malfunctioning satellite. And, of course, there will be planned/scheduled removal and replacement of end-of-life satellites, as may be occasioned by low fuel, telemetry indicating imminent impending failure of components, etc.

Figure 4A:
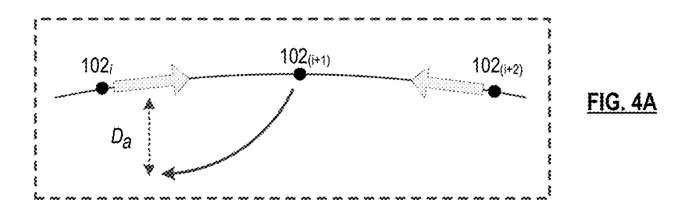
FIGS. 4A-4D depict various techniques for removing a satellite from, adding it to, or replacing a satellite in a plane of the constellation, in accordance with embodiments of the invention.
Figure 4B:
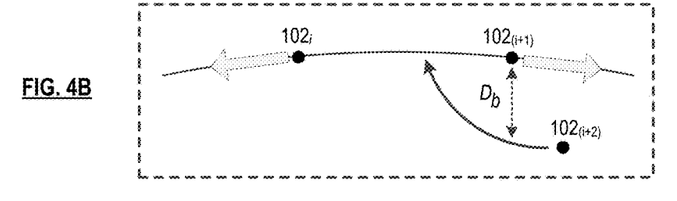
Figure 4C:
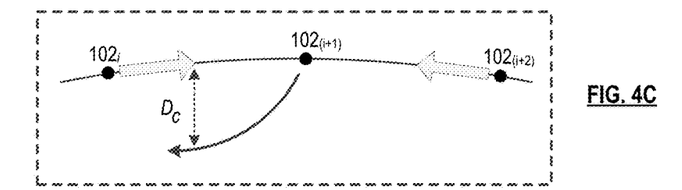
Figure 4D:
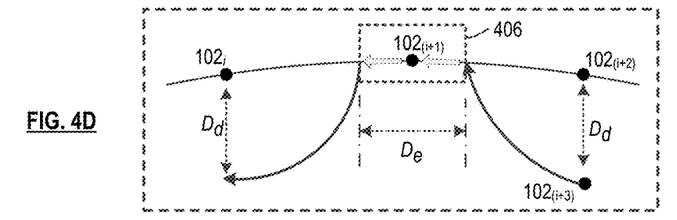

FIGS. 4A through 4D depict illustrative and non-limiting methods for adding and removing satellites from the constellation, wherein FIG. 4A depicts removal of a satellite due to equipment failure, FIG. 4B depicts the addition of a satellite, FIG. 4C depicts the planned removal of a satellite, and FIG. 4D depicts the replacement (addition and removal) of a satellite.

FIG. 4A depicts the removal of satellite $102_{(i+1)}$ as occasioned by an equipment failure that results in it being unable to provide service to users. It is desirable to remove this satellite as quickly as possible, since its failure creates a gap or hole in coverage. Consequently, all satellites in the plane are advantageously re-spaced as soon as possible to close the gap. This is illustrated for satellites $102_i$ and $102_{(i+2)}$, which are adjacent to the failed satellite. As illustrated by the arrows, satellite $102_i$ is moved to the right and satellite $102_{(i+2)}$ is moved to the left to close the gap created by the removal of satellite $102_{(i+1)}$. Other satellites in the plane (not depicted) are likewise shifted to even out the spacing between all satellites in the plane. In the equipment failure scenario considered here, the maneuvers (i.e., removing satellite $102_{(i+1)}$ and re-spacing) happen nearly simultaneously.

FIG. 4B depicts the addition of satellite to a plane. This will happen, for example, as new satellites are added to the constellation and as replacement satellites are needed to replace failed/removed satellites. The new satellite ($102_{(i+2)}$) is placed in a space between two other satellites in the plane (i.e., here, satellites $102_i$ and $102_{(i+1)}$). This is the first maneuver in this process. After satellite $102_{(i+2)}$ is in place and operational, in a second maneuver, the other satellites in the plane will be moved away from the added satellite, as indicated by the arrows, to re-establish the even spacing of operational satellites.

FIG. 4C depicts the planned removal of satellite $102_{(i+1)}$. In this scenario, satellite $102_{(i+1)}$ is nearing its end-of-life or has a known, impending equipment failure, thereby enabling its pre-planned decommissioning and removal. In this process, a first maneuver moves neighboring satellites $102_i$ and $102_{(i+2)}$ closer to the satellite being removed (i.e., in FIG. 4C, satellite $102_{(i+1)}$), as indicated by the arrows. This prevents opening a hole in coverage when the departing satellite is taken off-line. After the neighboring satellites are in position to prevent the coverage hole, the payload of departing satellite $102_{(i+1)}$ is shut down and, in a second maneuver, that satellite is extracted from the constellation.

FIG. 4D depicts the simultaneous replacement and removal of a satellite that is being decommissioned. Here, satellite $102_{(i+1)}$ is being removed and satellite $102_{(i+3)}$ is being added to replace it. In this process, the satellite to be removed (satellite $102_{(i+1)}$) is moved to one edge (in FIG. 4D, the left edge) of its station-keeping box 406. More or less simultaneously, replacement satellite $102_{(i+3)}$ is placed at the opposite edge (in FIG. 4D, the right edge) of station-keeping box 406. Once these two satellites are in position, replacement satellite $102_{(i+3)}$ is turned "on" to provide service and satellite $102_{(i+1)}$ is switched "off." In a second set of maneuvers, satellite $102_{(i+1)}$ is removed from the constellation and satellite $102_{(i+3)}$ is moved to the center of station-keeping box 406.

Distances $D_a$, $D_b$, $D_c$, and $D_d$ are the minimum close-approach distances that are expected between satellites entering/exiting the plane and those already in the plane and $D_e$ is the "length" of station-keeping box 406. In some embodiments, $D_a$=10 km, $D_b$=6 km, $D_c$=6 km, $D_d$=12 km, and $D_e$=26.4 km.

In the scenarios presented in the FIGS. 4A through 4D, operators of the constellation are reacting to the loss of a satellite in a plane by either redistributing the operational satellites or adding a replacement satellite. In some other embodiments, each plane will include one or more extra satellites. The extra satellite(s) are placed between active satellites. The active/operational satellites remain evenly spaced in the plane and the one or more spares are placed, arbitrarily, between them. In some embodiments, spare satellites are positioned in several locations around the plane in order to minimize the time to replace a failed satellite. The use of in-plane spare satellites will typically simplify the replacement of a satellite. It is notable that in prior-art constellation configurations wherein all satellites are kept at the same altitude, this sparing strategy would most likely not be possible to implement.

Figure 5A:
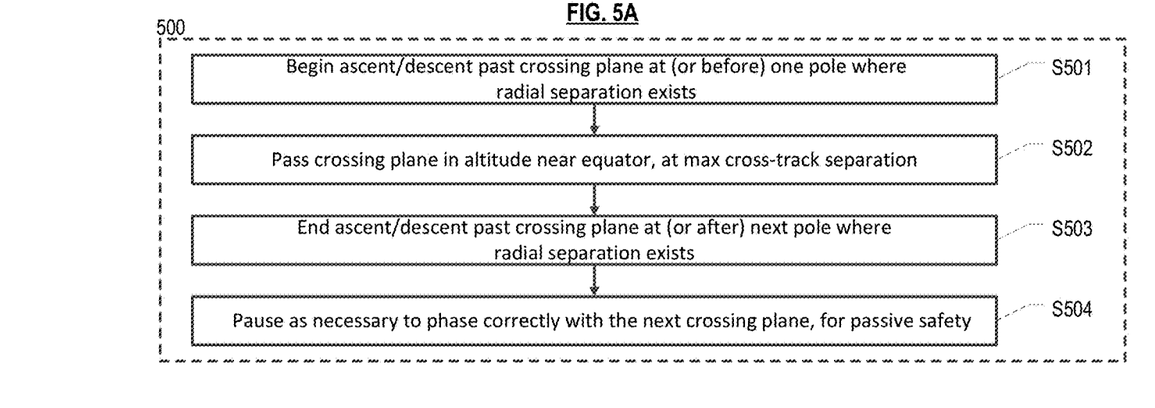
FIGS. 5A-5C depict a method in accordance with the invention by which a satellite can safely cross the planes of the constellation.

Although the multi-altitude configuration of constellation 100 in accordance with the invention simplifies issues such as satellite spacing, station-keeping, and collision avoidance, it does complicate satellite arrival and departure. This can be mitigated via method 500, depicted in FIG. 5A. The method is further illustrated, for the case of an ascending satellite, in FIGS. 5B and 5C. Application of method 500 to a descending satellite is simply the reverse of what is depicted in FIGS. 5B and 5C.

According to operation S501 of method 500, a satellite's ascent/descent past a crossing plane begins at (or before) one of Earth's poles, where radial separation exists between the path of the ascending/descending satellite and the orbit of the nearest satellite plane in the direction (ascent or descent) that the satellite is heading. (See, pole $P_1$ (FIG. 5B) and plane $104_4$ (FIGS. 5B, 5C).)

Figure 5B:
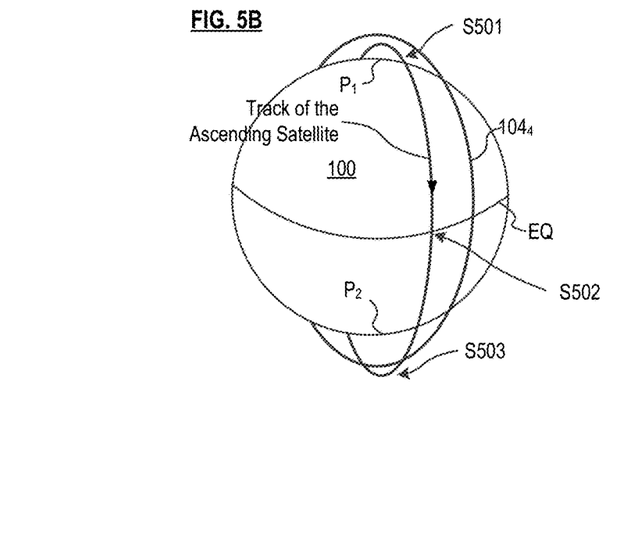
Figure 5C:
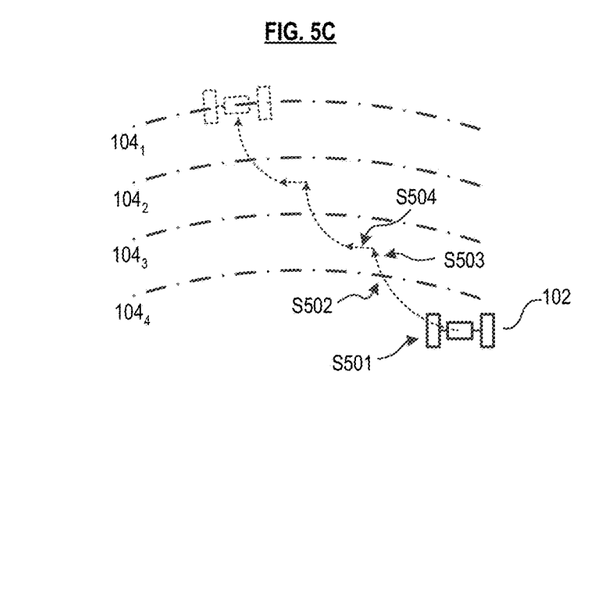

Per operation S502 of method 500, the ascending/descending satellite passes (in altitude) the crossing plane near the Earth's equator EQ, taking advantage of the maximum in cross-track separation that occurs at the equator, as depicted in FIG. 5B. (The RAAN of the ascending satellite will be at the RAAN of the plane to which it is heading. By the definition, the planes are separated in RAAN but have the same inclination, resulting in the maximum cross-track separation at (or near) the equator.)

In operation S503, the ascent/descent past the crossing plane is completed at (or after) the next pole, where radial separation again exists between the path of the ascending satellite and the orbit of the plane at issue. (See, pole $P_2$ (FIG. 5B).)

In operations S501 and S503, the language "at (or before)" and "at (or after)" is used with respect to when to begin and complete ascent, respectively. For a spacecraft with a traditional chemical thruster, the most efficient way of completing the transition defined at operations S501 through S503 is to perform a maneuver at one pole (e.g., the north pole) that results in the altitude over the next pole (e.g., the south pole) being higher than the plane it is crossing. The satellite then coasts to the next pole (the south pole) and performs a second maneuver that raises the orbit altitude over the other pole (the north pole) thereby completing the transition. This setup has the maximum cross track separation at the equator.

In the case of an electric thruster, the analysis is somewhat different because the electric thruster will remain on for the entire transition. Thrust could be started at the north pole and turned off at the south pole to accomplish the transition. However, the point at which the satellite crosses the nearest plane will not be aligned with the equator, which, as previously noted, is where the maximum cross-track distance is achieved. This may still be an acceptable crossing point, having enough cross track separation to be considered "safe." As will be appreciated by those skilled in the art, the precise location of the optimal thrust starting point (i.e., "at" or "before" the pole) is a function of the thrust capabilities and the beginning altitude offset of the satellite from the plane it is crossing.

For the purposes of this disclosure and the appended claims, the aforementioned transition will be defined to begin thrust at one pole and stop it at the other pole, since these are the locations at which an offset in altitude is desired. It is to be understood, however, that "at" means "at or before" (the first pole) and "at" means "at or after" (the second pole). For example, in some embodiments, a satellite thrusts continuously for many revolutions before and after the transition, as long as the trajectory is set to be below the other plane at one pole and above it at the next, while also having adequate cross-track separation at the actual altitude crossing point (even if that is not exactly at the equator crossing). It is within the capabilities of those skilled in the art to determine a location at which thrust should begin and a location at which it should end, in situations in which the "begin" and "end" locations are other than the two poles of the Earth.

Operation S504 requires pausing, as necessary, to phase correctly with the next crossing plane, for passive safety. In this context, "phase" means the location of ascending/descending satellite with respect to the location of the two nearest satellites in the crossing plane. To phase "correctly" means that the ascending/descending satellite should, at the time it crosses the plane, be located safely between the nearest two satellites in that plane. An ideal location would be at the mid-point between the two in-plane satellites; however, any position between the station-keeping boxes of the two in-plane satellites is acceptable. This provides passive safety, so that if the thruster on the ascending/descending satellite were to fail just as the satellite reached the altitude of the plane it is crossing, it would pass safely between the in-plane satellites when they all reached the pole at the same altitude. The "pause" of operation S504 provides time to troubleshoot a problem in a satellite or adjust the orbit of the plane if necessary to avoid a conflict in the future. This pause or dwell operation is illustrated in FIG. 5C, after the ascending satellite crosses plane $104_4$ on its way to plane $104_3$.

It was noted earlier that, for a large constellation having all its satellites at the same altitude, it is very problematic to maintain even spacing and safe distances between satellites within a plane when the number of satellites in some other planes differ (such as when a satellite in another plane fails). Having the constellation's planes at different altitudes, in accordance with the illustrative embodiment, removes the necessity for the planes to "mesh" together like gears, avoiding the aforementioned problem.

Figure 6A:
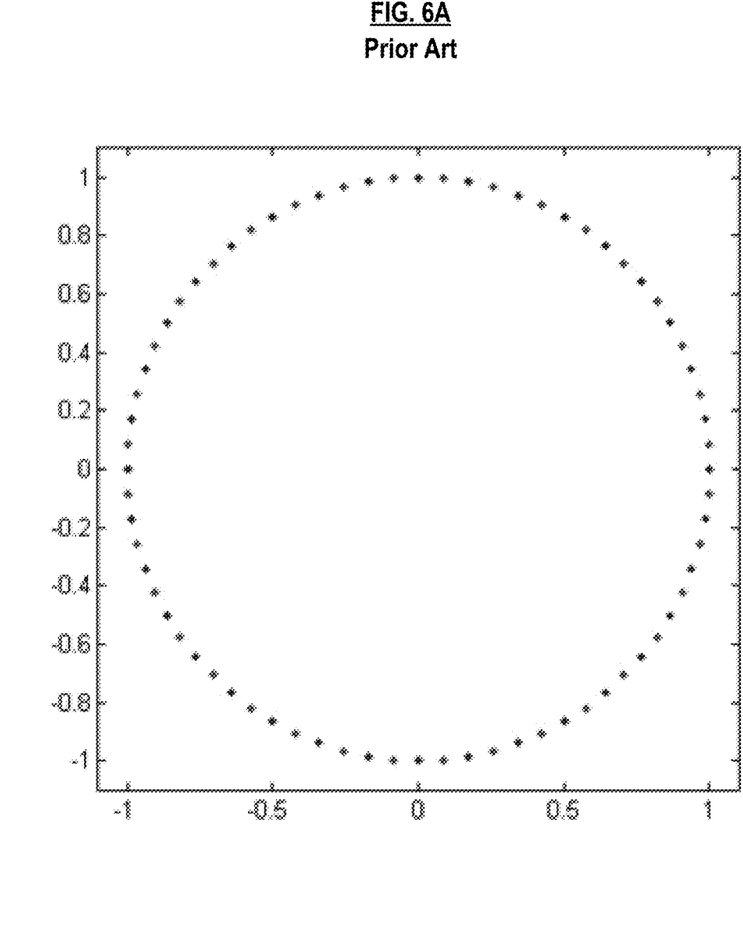
FIG. 6A depicts a constellation configuration in the prior art having two, equal-altitude planes of satellites, each having 36 evenly spaced satellites.
Figure 6B:
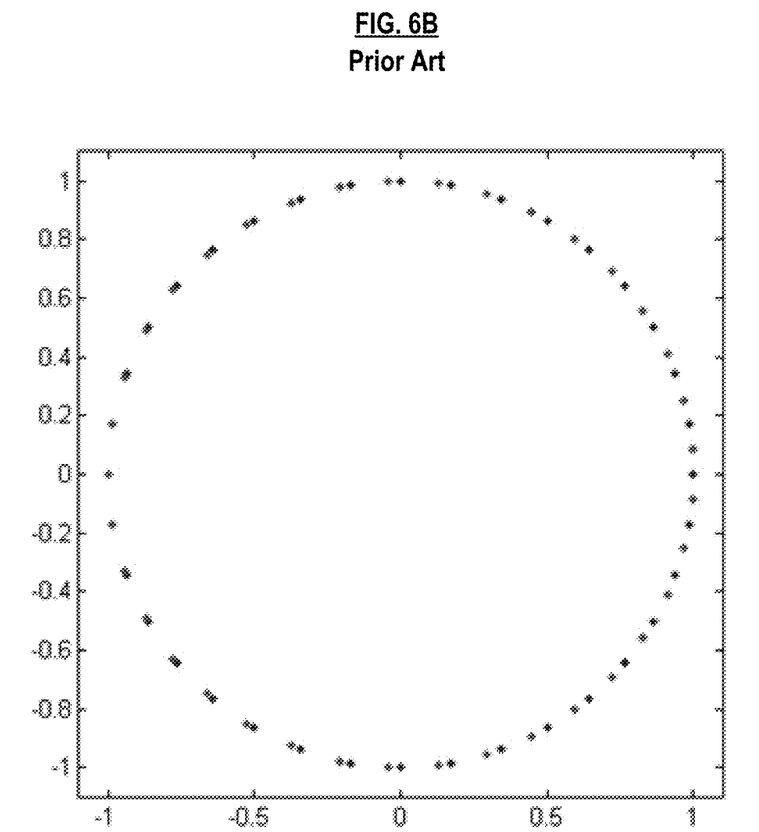
FIG. 6B depicts a constellation configuration in the prior art having two, equal-altitude planes of satellites, one having 36 evenly spaced satellites, the other having 37 evenly spaced satellites.
Figure 6C:
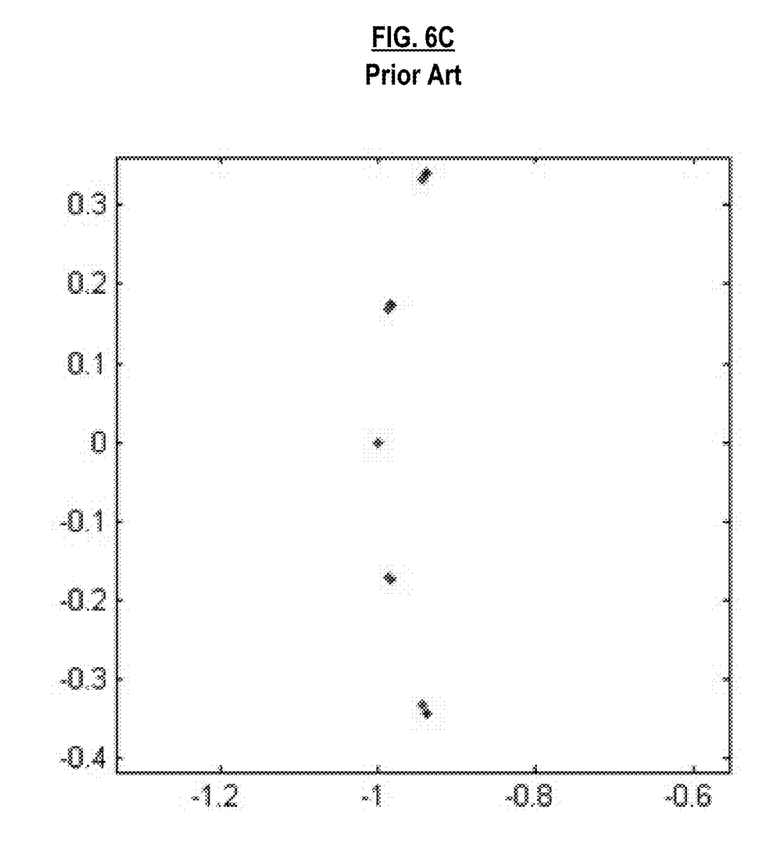
FIG. 6C depicts further detail of the constellation configuration of FIG. 6B, illustrating little or no spacing between satellites in the two planes.

FIGS. 6A through 6C illustrate the problem, simplified by examining only two planes. The "units" for FIGS. 6A through 6C are canonical units; the distance unit being defined as the nominal orbit radius. Consequently, the information depicted is agnostic to the actual size of an orbit—the plot is applicable to satellites at any altitude. For example, using a nominal altitude of 1200 km and mean Earth radius of 6371 km yields a distance unit of 7571 km. Therefore, a "1" along an axis represents the orbital radius, which is 7571 km in this example.

FIG. 6A depicts the "meshing" of two planes, each with 36 satellites. Even with both planes at the same altitude, it is easy to configure the planes for maximum miss-distance while maintaining even spacing within each plane. For this configuration, there is 5 degrees of relative spacing between satellites in the two planes.

FIG. 6B depicts what happens if one additional satellite is added to one of the planes (i.e., 36 satellites in one of the planes and 37 satellites in the other plane). If the satellites within each plane maintain even spacing, this results in only 0.1352 degrees relative spacing between some of the satellites in the two planes. This is less than the combined station-keeping box size of the two satellites, which is an insufficient amount of separation. This is illustrated more clearly in FIG. 6C, which depicts twelve of satellites of the arrangement shown in FIG. 6B: six from one plane and six from the other plane.

Uncontrolled Satellites. Satellites that become uncontrolled within the constellation can become a hazard to the constellation. This is particularly true for prior-art constellations wherein all of the satellites are at the same altitude. Analysis of uncontrolled satellites in the constellations disclosed herein reveal that loss of maneuverability does not cause an immediate risk to the constellation.

In particular, relative motion between a failed satellite and other satellites in the same plane is slow, providing time to plan and carry out an avoidance maneuver if required. Satellites that fail in the constellation do not interfere with adjacent planes for a long time; based on the configuration provided in Table II, the shortest period of time in which a satellite can reach the next plane is about 14 years, based on worst-case solar flux. Also, the tiered plane design provides flexibility for addressing failed satellites and other debris. In particular, the altitude of a plane can be raised or lowered slightly (c.a. 100 to 200 meters) to avoid any objects that have repeat conjunctions with the plane. It is notable that if the entire constellation is allowed to decay (c.a. 50-400 meters/year), both active and failed satellites will behave similarly, thereby greatly increasing the time to a close approach.

In the illustrative embodiment, all of the planes in the constellation are at a different altitude. In some alternative embodiments, some of the planes are at the same altitude. Such same-altitude planes can be considered to form a "shell." Thus, in some alternative embodiments, the constellation comprises one or more shells, each shell including two or more planes of satellites, wherein the included planes are at the same altitude. Thus, for example, a constellation consistent therewith can include (1) a plurality of planes, each at its own altitude, and (2) at least one shell, wherein the shell includes at least two planes that are at the same altitude.

In some further alternative embodiments, one or more planes is sub-divided into two or more sub-shells, wherein each sub-shell: (1) has some portion of the satellites of the plane, and (2) is at a different altitude than the other sub-shells of the plane. Thus, for example, a plane having 39 satellites could be divided into three sub-shells, each containing an equal number (i.e., 13) satellites. Or, a plane having 39 satellites could be divided into three sub-shells, at least one of which contains a different number of satellites than the other two sub-shells. Or, a plane having 39 satellites could be divided into two sub-shells of unequal numbers of satellites (e.g., 19 satellites and 20 satellites, 10 satellites and 29 satellites, etc.).

In some yet additional embodiments, a plane might be accompanied by a sub-plane. In such embodiments, the nominal number of satellites intended for the plane are all flown at the same altitude (i.e., in the plane), and the sub-plane contains a much smaller number of satellites, including, for example, satellites that are intended as spares or intended to be used for a future increase in the nominal number of in-plane satellites. In such an embodiments, the sub-plane is substantially closer to its companion plane than any other plane, consistent, of course, with safety concerns.

Benefits of sub-dividing a plane into sub-shells or having a sub-plane accompany a plane may include the ability to: (a) store spare satellites near the plane, (b) maximize satellite density (e.g., for providing higher bandwidth or other mission objects), (c) provide surge resources (e.g., temporary increases in bandwidth, etc.), and (d) provide for enlargement of the constellation.

It is to be understood that the disclosure describes a few embodiments and that many variations of the invention can easily be devised by those skilled in the art after reading this disclosure and that the scope of the present invention is to be determined by the following claims.

What is claimed:

1. A system of satellites configured in a satellite constellation, the system of satellites comprising: a plurality of satellites, the plurality of satellites including at least a first group of satellites, a second group of satellites, a third group of satellites and a fourth group of satellites, wherein: (a) the plurality of satellites are organized into a plurality of orbital planes, each orbital plane of the plurality of orbital planes including at least one of the first, second, third and fourth groups of satellites, wherein the plurality of planes includes a first orbital plane, a second orbital plane, and a third orbital plane, wherein the first group of satellites is configured to follow a first orbit in the first orbital plane at a first altitude, the second group of satellites is configured to follow a second orbit in the second orbital plane at a second altitude, and the third group of satellites is configured to follow a third orbit in the third orbital plane at a third altitude; wherein the first, second and third altitudes differ from each other; and (b) the fourth group of satellites is configured to follow a fourth orbit in the first orbital plane, the fourth orbit differing from the first orbit by being at a fourth altitude different from the first altitude of the first orbit, wherein there is a fifth group of satellites configured to follow a fifth orbit in the first orbital plane, the fifth orbit differing from the first orbit and fourth orbit by being at a fifth altitude different from the first altitude of the first orbit and fourth altitude of the fourth orbit, and wherein said fourth and fifth orbits comprise sub-shells.

2. The system of satellites according to claim 1 wherein each orbital plane of the first, second and third orbital planes includes an equal number of satellites.

3. The system of satellites according to claim 1 wherein at least one of the orbital planes of the plurality of orbital planes has a different number of satellites than other of the orbital planes.

4. The system of satellites according to claim 3 wherein satellites in each orbital plane of the first, second and third orbital planes are equally spaced from one another.

5. The system of satellites according to claim 1 wherein each orbital plane of the plurality of orbital planes is spaced apart from each other orbital plane by an amount in a range of about 500 to about 5000 meters.

6. The system of satellites according to claim 1 wherein the plurality of satellites includes at least 100 satellites.

7. The system of satellites according to claim 1 wherein there are a first plurality of satellites in each of the second and third orbital plane and a second plurality of satellites, greater than the first plurality of satellites, in the first orbital plane.

8. The system of satellites according to claim 1 wherein the satellites are in low Earth orbit.

9. The system of satellites according to claim 1 wherein, a semi-major axis of an orbit of a satellite in respective orbital planes of the first, second and third orbital planes is in a range from about 7500 kilometers to about 7700 kilometers.

10. The system of satellites according to claim 1 wherein, of the satellites in said first orbital plane, a majority thereof are in service, and at least two satellites in said fourth orbit are spares that are not in service.

11. The system of satellites according to claim 1 wherein the satellites are communications satellites.

12. The system of satellites according to claim 1 wherein the satellites provide internet connectivity to users.

13. A system of satellites configured in a satellite constellation, the system of satellites comprising: a plurality of satellites, the plurality of satellites including at least a first group of satellites, a second group of satellites, a third group of satellites and a fourth group of satellites, wherein: (a) the plurality of satellites are organized into a plurality of orbital planes, each orbital plane of the plurality of orbital planes including at least one of the first, second, third and fourth groups of satellites, wherein the plurality of planes includes a first orbital plane, a second orbital plane, a third orbital plane and a fourth orbital plane, wherein the first group of satellites is configured to follow a first orbit in the first orbital plane at a first altitude, the second group of satellites is configured to follow a second orbit in the second orbital plane at a second altitude, the third group of satellites is configured to follow a third orbit in the third orbital plane at a third altitude, and the fourth group of satellites is configured to follow a fourth orbit in a fourth orbital plane at a fourth altitude, and wherein the first, second and third altitudes differ from each other; (b) the second and third orbital planes are adjacent the first orbital plane and are spaced at least a first distance apart from the first orbital plane on opposite sides thereof, and (c) fourth orbital plane is adjacent said first orbital plane and spaced apart from the first orbital plane by a second distance less than said first distance, whereby the fourth orbital plane comprises a sub-plane that is a companion plane to the first orbital plane, wherein the fourth orbital plane is a sub-plane, of the first orbital plane containing a nominal number of satellites and the sub-plane containing spare or supplemental satellites for the first orbital plane.

14. The system of satellites according to claim 1 wherein at least two orbital planes of the plurality of orbital planes are configured with respective orbits at a same altitude as one another.

15. The system of satellites according to claim 13 wherein all of the orbital planes of the plurality of orbital planes are configured with respective tracks at respective different altitudes from one another.

16. The system of satellites according to claim 13, wherein the altitude of satellites in the first orbit of the first orbital plane differs from the altitude of satellites in the fourth orbit of the fourth orbital plane.

\* \* \* \* \*